United States Patent [19]

Kise

[11] Patent Number: 4,597,531
[45] Date of Patent: Jul. 1, 1986

[54] MATERIAL SPREADER
[75] Inventor: Jay R. Kise, Marysville, Ohio
[73] Assignee: The O. M. Scott & Sons Company, Marysville, Ohio
[21] Appl. No.: 648,660
[22] Filed: Sep. 7, 1984
[51] Int. Cl.⁴ ........................................... A01C 17/00
[52] U.S. Cl. .................................... 239/650; 239/685; 239/687
[58] Field of Search .............. 239/687, 681, 668, 665, 239/666, 518, 524, 650; 222/564, 408

[56] References Cited

U.S. PATENT DOCUMENTS

| | | | |
|---|---|---|---|
| 2,687,892 | 8/1954 | Kinsella | 239/684 |
| 2,955,828 | 10/1960 | Kinsella | 275/15 |
| 3,576,262 | 4/1971 | Koncheska et al. | 214/17 |
| 3,682,395 | 8/1972 | Van der Lely et al. | 239/666 |
| 4,234,131 | 11/1980 | Baker | 239/687 |
| 4,272,028 | 6/1981 | Cobb | 239/687 |
| 4,367,848 | 1/1983 | Ehmke et al. | 239/665 |
| 4,497,446 | 2/1985 | Van der Lely et al. | 239/687 |

FOREIGN PATENT DOCUMENTS 834611 5/1960 United Kingdom ................ 239/687

Primary Examiner—Joseph F. Peters, Jr.
Assistant Examiner—Scott Malpede
Attorney, Agent, or Firm—James B. Raden; Harold J. Holt

[57] ABSTRACT

A spreader for particulate material, the spreader being of the broadcast type having a hopper from which particulate material is discharged onto a rotating impeller. To provide adjustment for materials of various physical properties, a conically-shaped deflector is mounted between the hopper and impeller. The deflector is helically shaped at the bottom so that it has a gradually varying radius. By rotary adjustment of the deflector, particulate material can be discharged onto a preselected portion of the impeller.

12 Claims, 10 Drawing Figures

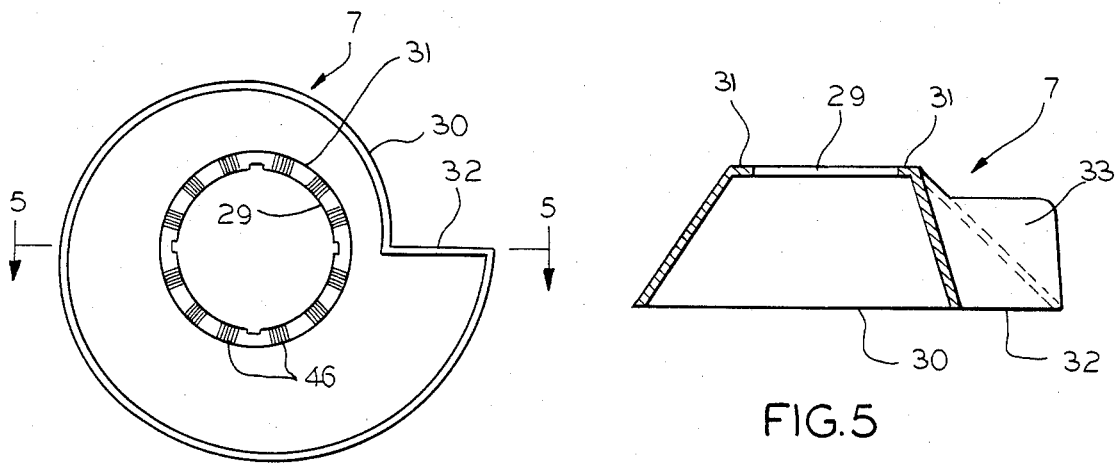
FIG.4   FIG.5
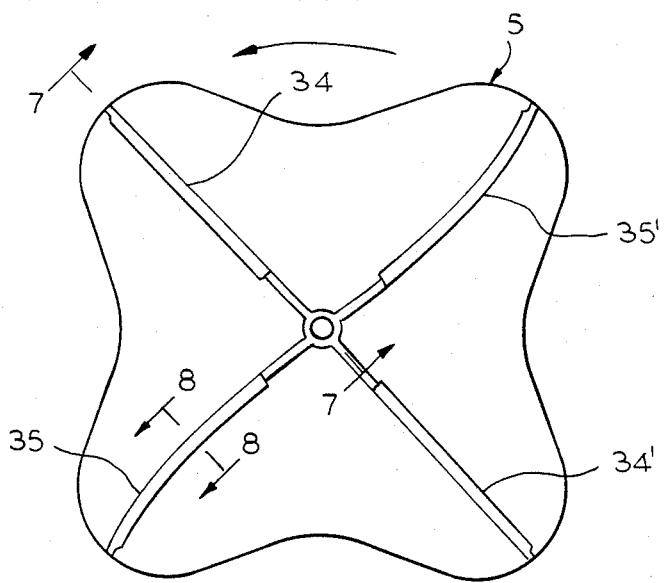
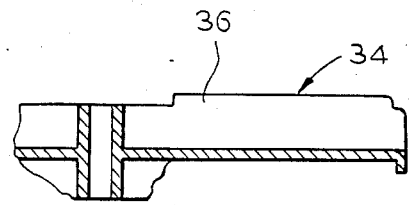
FIG.7
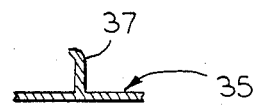
FIG.8
FIG.6
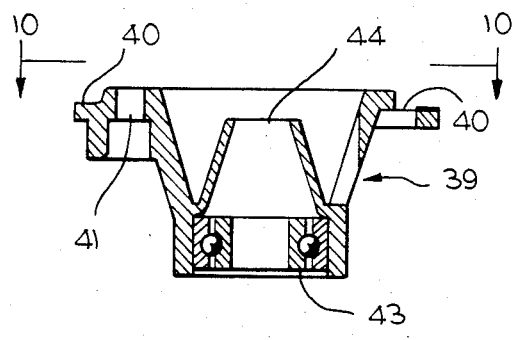
FIG.9
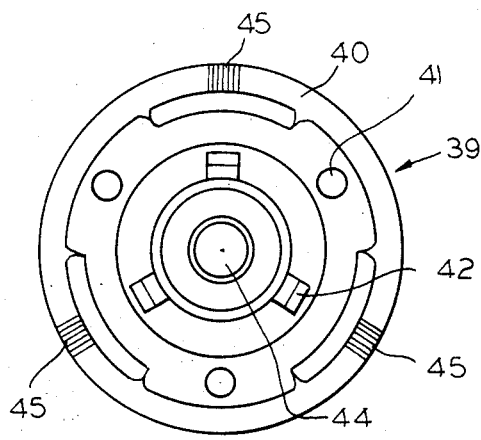
FIG.10

MATERIAL SPREADER

This invention relates to a material spreader and particularly to a spreader of the broadcast type used for the distribution of fertilizer, pesticides, seeds and other finely divided material to the soil or vegetation.

Broadcast or rotary spreaders typically discharge particulate material onto a rotating impeller and the particulate material is then cast out by the impeller to cover a region much wider than the dimensions of the spreader. The evenness or uniformity of particle distribution is controlled by the size, shape and placement of the fins on the impeller, the concavity (if any) of the impeller, its speed and the radial and angular location on the impeller where material is dropped. On spreaders for small lawns, these factors are usually fixed at a compromise value intended for optimum results for a variety of particle sizes and densities. On larger commercial and agricultural spreaders, one or more of the controlling factors are usually adjustable to optimize pattern performance as a function of the physical characteristics of the particles. Typical means of pattern adjustment include changing fin angle, rotating the drop point angularly on the impeller and moving the drop point radially by linear movement of a flat or V-shaped deflector. One such adjustment means is shown in U.S. Pat. No. 4,367,848 to Ehmke et al which uses axially adjustable vanes in combination with a conical spinner to achieve even distribution of a dry material.

However, most such adjustable controls are sufficiently complex and burdensome to discourage frequent use of the adjustments. Rotating ports, while effective, typically require a rotating rate adjustment mechanism and a resulting complex control linkage. Radial adjustment of the drop point with a linear linkage places severe physical restraints on the amount of adjustment possible.

A further shortcoming of most currently available spreaders stems from making all of the impeller fins identical on a given spreader. This leads to concentrated areas in the distribution pattern due to the identical fins tending to throw most material the same radial distance. This problem is compounded by the fact that many spreaders drop onto the impeller in one or more discrete points which then result in peaks in the pattern.

The prior art shows a variety of devices for obtaining even distribution of material of a single type. For example, even grain distribution is obtained with a rotatable deflector in the shape of a spiral-like cone in Kinsella U.S. Pat. Nos. 2,687,892 and 2,955,828. Conical deflectors are also shown in U.S. Pat. Nos. 4,272,028 to Cobb and 3,576,262 to Konchesky et al. Radially curved fins on an impeller are shown in U.S. Pat. No. 3,682,395 to van der Lely et al.

It is a primary object of the present invention to provide a material spreader having a deflector which may be easiy and effectively adjusted for the uniform distribution of materials of various physical properties.

It is an additional object of this invention to provide a material spreader having an impeller which provides variation in the radial throw of the particulate material.

The foregoing and other objects of the invention are achieved by the use of a deflector combining both a conical and helical shape to merge material which has been discharged into a smooth arc dropping at a preselected portion of the impeller. The bottom edge of the deflector has a variable radius and rotation of the deflector radially changes the drop area on the impeller to correct for materials of various physical properties. Further, the impeller preferably has alternate straight and curved fins to provide variation in radial flow of material, thus improving the uniformity of distribution.

More specifically, the invention is directed to a spreader for particulate material of the type having means for discharging the particulate material downwardly from the spreader and rotatable means in association with the discharge means for broadcasting the discharged material in a generally radial path. The improvement comprises a conically-shaped deflector axially mounted between the discharge means and the broadcast means with its wider dimension facing the broadcast means, the bottom edge of the deflector having a radius which gradually varies from a given value to a larger value, the deflector being rotatably adjustable about its axis to one of said radii. The deflector and discharge means are aligned so that particulate material is discharged onto the outer surface of the deflector, whereby upon discharge, particulate material is deflected onto a preselected portion of the broadcast means. In its preferred form, the deflector is circular at the top and helical at the bottom and the impeller has a plurality of radial fins, alternate ones of which are straight, the remaining fins being curved in the direction of rotation of the impeller during operation of the spreader.

The invention will be better understood by reference to the accompanying drawing in which:

FIG. 4 is an enlarged view of the deflector shown in FIGS. 1 and 2 as seen from the bottom;

FIG. 5 is a crossectional view of the deflector taken along the lines 5—5 of FIG. 4;

FIG. 6 is a plan view of the impeller of the spreader as seen along the lines 4—4 of FIG. 2;

FIG. 7 is a crossectional view of a portion of the impeller taken along the lines 7—7 of FIG. 6;

FIG. 8 is a crossectional view of a different portion of the impeller taken along the lines 8—8 of FIG. 6;

FIG. 9 is a crossectional view of a bearing mount used in the spreader of FIGS. 1 and 2; and FIG. 10 is a plan view of the bearing mount as viewed along the lines 10—10 of FIG. 9.

Figure 1:
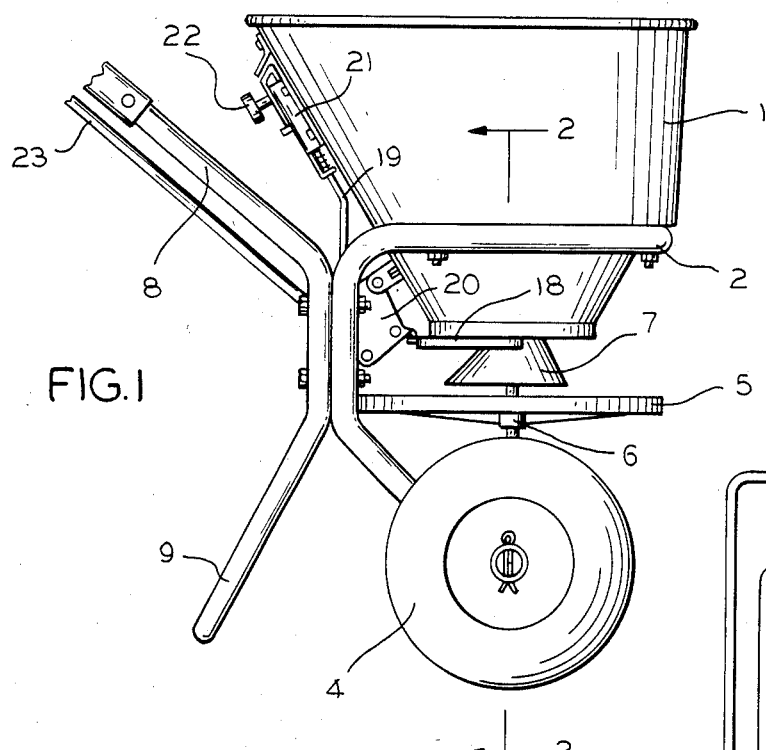
FIG. 1 is a side elevational view of a spreader in accordance with the invention.
Figure 3:
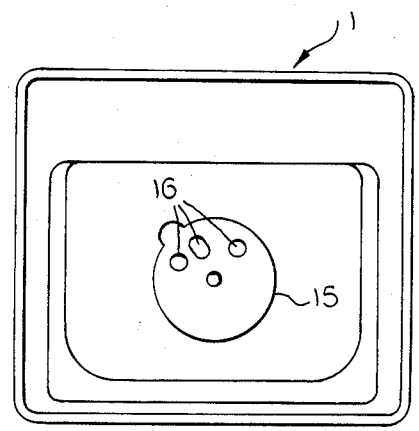
FIG. 3 is a plan view of the hopper of the spreader shown in FIG. 2.
Figure 2:
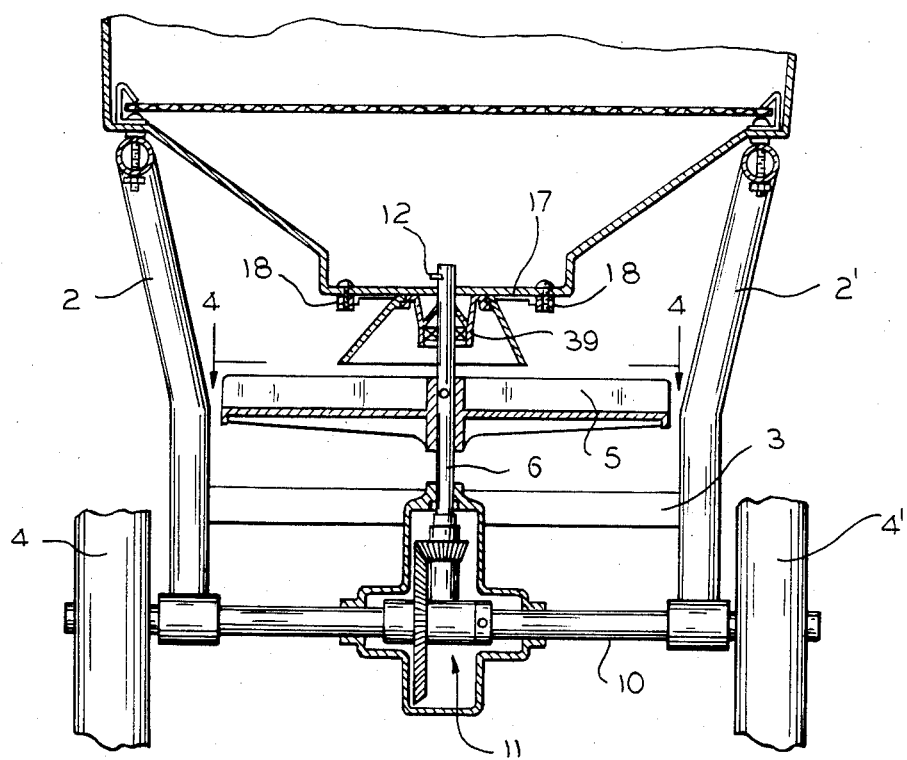
FIG. 2 is a crossectional view of the spreader taken along the lines 2—2 of FIG. 1.

Referring to the drawing and particularly FIGS. 1-3, the spreader of the invention comprises a hopper 1 for particulate material supported by a frame comprising tubular side members 2 and 2' connected by a cross brace 3, the tubular members being mounted on a pair of ground engaging wheels 4 and 4'. The broadcast means comprises an impeller 5 horizontally and fixedly mounted on a shaft 6 rotatably driven at its lower end by a powered drive connection. A conically-shaped deflector 7 is axially and centrally mounted between hopper 1 and impeller 5 with its wider dimension facing the impeller. Bolted to frame members 2 and 2' is a tubular member 8, the upper portion of which serves as a handle, the lower portion of which serves as a leg 9 for support of the spreader when it is not being advanced. An axle 10 is journaled within frame members 2 and 2'. One or both wheels are fixedly connected to axle 10 for transmitting power to shaft 6 by means of a set of bevel gears 11 which rotates impeller 5 as the spreader is advanced. An agitator 12 is mounted on the upper portion of shaft 6 within hopper 1 and rotates with the impeller.

Particulate material is discharged from hopper 1 by means of a discharge outlet 15 comprising a set of clustered discharge ports 16 located off-center in the bottom portion of the hopper. The amount of particulate material flowing through discharge ports 16 is metered by adjustment of the size of the ports. This is accomplished by a shut-off plate 17 slidably mounted within a guide plate 18 mounted beneath the center of hopper 1. A rate control rod 19 is attached at one end thereof to a pivot lever 20 which in turn is attached to shut off plate 17. The control rod extends vertically to the rear outer surface of the hopper where it cooperates with a rate control plate 21, suitable indexed, and a control knob 22 to adjust discharge ports 16 from a completely open to a completely closed position to meter the amount of particulate material passing through the discharge outlet. Opening and closing of the discharge outlet is controlled by shut-off rod 23. With the exception of the deflector and certain related design features of the spreader set forth below, the foregoing features of the spreader are well known.

Deflector 7 is more clearly seen in FIGS. 4 and 5. The top portion 29 of the cone-shaped deflector is circular while the bottom portion 30 is helical. Top circular portion 29 is concentric with its axis of rotation and with shaft 6 around which it is rotatably adjustable. The portion of the helix at which the smallest radius meets the largest radius forms a sharply angled surface 32 which has an extension 33. The extension acts as a handle to rotate the deflector for the purpose of adjustment. It will be seen that the bottom edge of the deflector has a radius which gradually varies from a given value (on the inner extremity of Surface 32) to a larger value (on the outer extremity of surface 32). The top portion of the deflector has an annular surface 31 for holding the deflector in place against the bottom of the hopper.

The impeller 5 is shown more clearly in FIGS. 6–8, the arrow above FIG. 6 showing the direction of rotation. The impeller has four radial fins, two of which, 34 and 34' are straight and two of which, 35 and 35', are curved forward in the direction of rotation of the impeller. The straight fins alternate with the curved fins providing two different throw radii. This impeller design also helps to disperse the particles angularly, resulting in a more uniform pattern. The fins have horizontal lips 36, 37 to reduce the amount of particulate material that bounces off the impeller or over the fins.

The deflector is held in a fixed adjustable position beneath the discharge means of the hopper on shaft 6 by means of a bearing mount 39, most clearly shown in FIGS. 9 and 10. The bearing mount has an outer ledge 40 which bears against the annular surface 31 of the deflector when the bearing mount is bolted in place to the underside of the hopper through threaded holes 41. The bearing mount contains a further set of three holes 42 to permit any particulate material that enters the bearing mount to flow through. The bearing mount also contains an impeller bearing 43 for rotation of impeller 5 on shaft 6 during operation of the spreader. The shaft 6 extends through an opening 44 in bearing mount 39, the opening having a diameter slightly larger than the shaft so that there is sufficient clearance to permit the shaft to rotate freely in opening 44. The surface of ledge 40 on the bearing mount contains three sets of striations 45 mating with complimentary sets of striations 46 on the underside of a facing annular surface 31 on the top of the deflector. As the deflector is adjusted to a new radial position, the mating striations serve to hold the deflector in place.

Discharge outlet 15 is aligned with respect to the deflector such that particulate material is discharged onto the outer outwardly angled surface of the deflector. As the deflector is rotated for purposes of adjustment, the bottom edge in effect moves in or out radially on the impeller and the angle of the deflector surface changes, becoming steeper at smaller radii. The deflector is rotated to the smaller radial position for larger particle or higher density materials and to larger radii for smaller particle or lower density materials.

The rotary spreader of the invention provides a distribution system for particulate material having a smooth distribution pattern without significant peaks or skewing. It also provides adequate and convenient pattern adjustment for a wide range of material types. Moreover, the spreader rate and pattern mechanism are greatly simplified as compared to prior systems offering comparable performance.

What is claimed is:

1. In a spreader for particulate material having means for discharging said particulate material downwardly from said spreader and rotatable means in association with said discharge means for broadcasting said discharged material in a generally radial path, the improvement comprising a conically-shaped deflector axially mounted between said discharge means and said broadcast means with its wider dimension facing said broadcast means, the bottom edge of said deflector having a radius which gradually varies from a given value to a larger value, said deflector being rotatably adjustable about the axis thereof to one of said radii but remaining stationary during operation of the spreader, said deflector and discharge means being aligned so that particulate material is discharged onto the outer surface of said deflector, whereby upon discharge, particulate material is deflected onto a preselected portion of said broadcast means.

2. The spreader of claim 1 in which said conically-shaped deflector is circular at the top and helical at the bottom thereof.

3. The spreader of claim 2 in which the deflector has a sharply angled surface extending vertically upward from the bottom helical portion thereof where the smallest radius meets the largest radius.

4. The spreader of claim 3 in which said sharply angled surface on the deflector has an extension which acts as a handle to rotate the deflector for adjustment.

5. The spreader of claim 1 in which said broadcast means is an impeller having a plurality of radial fins on the broadcast surface thereof.

6. The spreader of claim 5 in which alternate radial fins on the impeller are straight and the remaining fins are curved in the direction of rotation of said impeller.

7. The spreader of claim 6 in which the total number of fins is four.

8. The spreader of claim 1 in which said discharge means includes a hopper for the particulate material having a discharge outlet mounted off-center in the bottom thereof.

9. The spreader of claim 8 in which said discharge outlet comprises a plurality of discharge ports clustered off-center in the bottom of said hopper.

10. The spreader of claim 1 in which said deflector and broadcast means are mounted on a shaft extending axially from said hopper to a power drive connection.

11. The spreader of claim 10 in which said deflector is held in position on said shaft by a bearing mount containing a bearing for rotation of the impeller on said shaft, said bearing mount holding the deflector in fixed adjustable position beneath said discharge means.

12. The spreader of claim 11 in which said bearing mount has striations on its upper surface and said deflector has mating striations on a facing annular surface on the top thereof, said mating sets of striations serving to hold the deflector in said fixed adjustable position.

* * * * *